US012789166B2

(12) United States Patent
Zhang et al.

(10) Patent No.: US 12,789,166 B2
(45) Date of Patent: Nov. 10, 2026

(54) USE OF CARBOXYLATE COMPOUND AS ABSORBENT FOR CAPTURING CARBON DIOXIDE

(71) Applicant: BEIJING YUTAN TECHNOLOGY CO., LTD, Beijing (CN)

(72) Inventors: Zhaofu Zhang, Beijing (CN); Buxing Han, Beijing (CN)

(73) Assignee: BEIJING YUTAN TECHNOLOGY CO., LTD, Beijing (CN)

( * ) Notice: Subject to any disclaimer, the term of this patent is extended or adjusted under 35 U.S.C. 154(b) by 755 days.

(21) Appl. No.: 18/245,661

(22) PCT Filed: Sep. 26, 2021

(86) PCT No.: PCT/CN2021/120628

§ 371 (c)(1),
(2) Date: Mar. 16, 2023

(87) PCT Pub. No.: WO2022/111026

PCT Pub. Date: Jun. 2, 2022

(65) Prior Publication Data

US 2023/0330624 A1 Oct. 19, 2023

(30) Foreign Application Priority Data

Nov. 27, 2020 (CN) ......................... 202011359524.1

(51) Int. Cl.

*B01J 20/22* (2006.01)
*B01D 53/14* (2006.01)
*B01J 20/34* (2006.01)

(52) U.S. Cl.

CPC .......... *B01J 20/22* (2013.01); *B01D 53/1418* (2013.01); *B01D 53/1475* (2013.01); *B01J 20/3425* (2013.01); *B01J 20/3483* (2013.01); *B01J 20/3491* (2013.01); *B01D 2252/205* (2013.01); *B01D 2257/504* (2013.01)

(58) Field of Classification Search

CPC .... B01J 20/22; B01J 20/3425; B01J 20/3483; B01J 20/3491; B01D 53/1418; B01D 53/1475; B01D 2252/205; B01D 2257/504; B01D 53/62; B01D 2252/30; B01D 53/1425; B01D 53/1493; C02F 1/285; C02F 2101/10; Y02C 20/40

See application file for complete search history.

(56) References Cited

U.S. PATENT DOCUMENTS

| | | | | |
|---|---|---|---|---|
| 11,351,498 | B2 | 6/2022 | Barnes et al. | |
| 2006/0251558 | A1 | 11/2006 | Chinn et al. | |
| 2012/0204717 | A1 * | 8/2012 | Dinnage ............ | B01D 53/1425 95/91 |
| 2013/0058852 | A1 | 3/2013 | Atkins et al. | |
| 2020/0206677 | A1 | 7/2020 | Barnes et al. | |

FOREIGN PATENT DOCUMENTS

| | | | |
|---|---|---|---|
| CN | 101648877 | A | 2/2010 |
| CN | 101693692 | A | 4/2010 |
| CN | 102516092 | A | 6/2012 |
| CN | 104263442 | A | 1/2015 |
| CN | 104277880 | A | 1/2015 |
| CN | 105561757 | A | 5/2016 |
| CN | 108744884 | A | 11/2018 |
| CN | 111246927 | A | 6/2020 |
| CN | 111943858 | A | 11/2020 |
| JP | 2012506306 | A | 3/2012 |
| JP | 2015071152 | A | 4/2015 |
| JP | 2016083623 | A | 5/2016 |
| JP | 2019098316 | A | 6/2019 |
| WO | 2010094923 | A2 | 8/2010 |
| WO | 2017136728 | A1 | 8/2017 |

OTHER PUBLICATIONS

Shimizu, Michiko, "Preparation and characterization of TEMPO-oxidized cellulose nanofibrils with ammonium carboxylate groups", International Journal of Biological Macromolecules, Issue 59, pp. 99-104. (Year: 2013).*

Supplementary Search Report dated Feb. 17, 2023 of corresponding CN patent application No. 2020113595241.

First Office Action of Corresponding Japanese Patent Application No. 202180063647.7 dated Mar. 19, 2025, 23 pages.

Second Office Action of Corresponding Australian Application No. 2021387058 dated Sep. 18, 2024, 4 pages.

Riemer, Pierce W.F and Ormerod, William G., International perspectives and the results of carbon dioxide capture disposal and utilisation studies, Energy Conversion and Management, June-Sep. 1995, pp. 813-818, vol. 36, Issues 6-9, UK, https://www.sciencedirect.com/science/article/abs/pii/019689049500128Z?via%3Dihub#aep-abstract-id4.

(Continued)

*Primary Examiner* — Anthony J Zimmer
*Assistant Examiner* — Jaanzeb C Raja
(74) *Attorney, Agent, or Firm* — Dinsmore & Shohl LLP

(57) ABSTRACT

Provided is the use of a carboxylate compound as an absorbent for capturing carbon dioxide and/or in the preparation of an absorbent for capturing carbon dioxide. In the carboxylate compound, the carboxylate anion is a carboxylate radical with a carbon chain having a carbon atom number of more than 3, or a branched-chain carboxylate radical having a carbon atom number of more than 6; and the cation is a substituted quaternary ammonium ion, quaternary phosphorus ion, pyridinium ion, pyrrolium ion, piperidinium ion, imidazolium ion or metal ion. In the present invention, a method which can capture carbon dioxide in an efficient and energy-saving manner by using a carboxylate compound and has water stability is involved, and the method comprises the following step: putting an aqueous solution of a carboxylate compound in a carbon dioxide atmosphere to absorb carbon dioxide, thereby obtaining a carboxylate and carbon dioxide conjugate precipitated from water.

6 Claims, No Drawings

(56) References Cited

OTHER PUBLICATIONS

Wilkes, John S., and Zaworotko, Michael J., Air and water stable 1-ethyl-3-methylimidazolium based ionic liquids, Journal of the Chemical Society, Chemical Communications, 1992, Issue 13, 965-967, US, https://onlinelibrary.wiley.com/doi/epdf/10.1002/chin.199243166.

Wang, Y. L. et al., Microstructural and Dynamical Heterogeneities in lonic Liquids, Chemical Reviews, Jul. 8, 2020, 120(13), 5798-5877, US, https://www.ncbi.nlm.nih.gov/pmc/articles/PMC7349628/.

Blanchard, Lynnette A., et al., Green processing using ionic liquids and CO2, Nature, 1999, 399, pp. 28-29, US, https://www.nature.com/articles/19887.

Bates, Eleanor D., et al., CO2 Capture by a Task-Specific lonic Liquid, Journal of the American Chemical Society, Feb. 12, 2002, vol. 124 Issue No. 6, 926-927, US, https://www.scholars.northwestern.edu/en/publications/co-sub2sub-capture-by-a-task-specific-ionic-liquid.

Zhang, J. M. et al., Supported Absorption of CO2 by Tetrabutylphosphonium Amino Acid Ionic Liquids, Chemistry A European Journal, May 15, 2006, pp. 4021-4026, vol. 12, Issue15, China and US, https://chemistry-europe.onlinelibrary.wiley.com/doi/full/10.1002/chem.200501015.

Huang, Y., et al., Preorganization and Cooperation for Highly Efficient and Reversible Capture of Low-Concentration C02 by Ionic Liquids, Angewandte Chemie International Edition, Oct. 16, 2017, pp. 13293-13297, vol. 56, Issue43, China and US, https://onlinelibrary.wiley.com/doi/abs/10.1002/anie.201706280.

Aghaie, M., et al., A systematic review on CO2 capture with ionic liquids: Current status and future prospects, Renewable and Sustainable Energy Reviews, Nov. 2018, pp. 502-525, vol. 96, Canada https://www.sciencedirect.com/science/article/abs/pii/S1364032118305100.

Holbrey, J. D., et al., 1,3-Dimethylimidazolium-2-carboxylate: the unexpected synthesis of an ionic liquid precursor and carbene-CO2 adduct, Chemical Communications, 2003, 28-29, Issue 1, US, France, Germany and Italy, https://pubs.rsc.org/en/content/articlehtml/2003/cc/b211519k.

Zanatta, M., et al., The Nature of Carbon Dioxide in Bare Ionic Liquids, Chemistry Sustainability Energy Materials, Jun. 19, 2020, pp. 3101-3109, vol. 13, Issue12, Portugal, Brazil and Spain, https://chemistry-europe.onlinelibrary.wiley.com/doi/abs/10.1002/cssc.202000574.

Quinn, R., et al;. , Salt Hydrates: New Reversible Absorbents for Carbon Dioxide, Journal of the American Chemical Society, Jan. 1, 1995, 329-335, 117, 1, US, https://pubs.acs.org/doi/pdf/10.1021/ja00106a035.

Quinn, R., Room Temperature Molten Carboxylate Salt Hydrates, Synthesis and Reactivity in Inorganic and Metal-Organic Chemistry, 2001, pp. 359-369, vol. 31, Issue 3, US, https://www.tandfonline.com/doi/full/10.1081/SIM-100002224?scroll=top&needAccess=true&role=tab&aria-labelledby=full-article.

Wang, G. N., et al., Low-Viscosity Triethylbutylammonium Acetate as a Task-Specific Ionic Liquid for Reversible CO2 Absorption, Journal of Chemical & Engineering Data, 2011, 56, 4, 1125-1133, US, https://pubs.acs.org/doi/full/10.1021/je101014q.

Anderson, K., et al., Carbon dioxide uptake from natural gas by binary ionic liquid-water mixtures, Green Chemistry, 2015, 4340-4354, vol. 17, Issue 8, UK, https://pubs.rsc.org/en/content/articlelanding/2015/gc/c5gc00720h/unauth.

Yasaka. Y., et al., Chemisorption of Carbon Dioxide in Carboxylate-Functionalized lonic Liquids: A Mechanistic Study, Chemistry Letters, 2014, 626-628, vol. 43, No. 5, Japan, https://www.journal.csj.jp/doi/abs/10.1246/cl.131180?journalCode=cl.

Yasaka, Y. and Kimura, Yoshifumi, Effect of Temperature and Water Concentration on CO2 Absorption by Tetrabutylphosphonium Formate lonic Liquid, Journal of Chemical & Engineering Data, 2016, 61, 2, 837-845, Japan, https://pubs.acs.org/doi/abs/10.1021/acs.jced.5b00694.

Yasaka, Y., et al., Role of Hydrogen-Bond Interactions in CO2 Capture by Wet Phosphonium Formate Ionic Liquid: A Raman Spectroscopic Study, ChemPhysChem, Jul. 5, 2018, vol. 19, Issue13, pp. 1674-1682, Japan, https://chemistry-europe.onlinelibrary.wiley.com/doi/abs/10.1002/cphc.201701324.

Suarez, P. A. Z., et al., The use of new ionic liquids in two-phase catalytic hydrogenation reaction by rhodium complexes, Polyhedron, Apr. 1996, pp. 1217-1219, vol. 15, Issue 7, Brazil, https://www.sciencedirect.com/science/article/abs/pii/0277538795003657.

Written Opinion of the International Searching Authority dated Dec. 29, 2021.

International Search Report of International Application No. PCT/CN2021/120628 dated Dec. 29, 2021.

Notification of Reasons for Refusal in Corresponding Japanese Application No. 2023-528494, 4 pages.

Third Party Observations of Corresponding European Patent Application No. 21896529.1 Dated Nov. 22, 2024, 4 pages.

* cited by examiner

USE OF CARBOXYLATE COMPOUND AS ABSORBENT FOR CAPTURING CARBON DIOXIDE

CROSS-REFERENCE TO RELATED APPLICATIONS

This application claims the benefit of International Application No. PCT/CN2021/120628, filed on Sep. 26, 2021, which claims the benefit of Chinese Patent Application 202011359524.1, filed on Nov. 27, 2020. The entire disclosures of the above applications are incorporated herein by reference.

TECHNICAL FIELD

The present application relates to the use of a carboxylate compound, in particular to the use of a carboxylate compound as an absorbent for capturing carbon dioxide and/or in the preparation of an absorbent for capturing carbon dioxide, and belongs to the technical field of carbon dioxide capture and carbon emission reduction.

BACKGROUND

With the advent of the industrial revolution, human beings have used fossil fuels to provide energy in large quantities, and at the same time emitted a large amount of carbon dioxide. The emission of carbon dioxide greatly exceeds the absorption and utilization capacity of nature, which leads to the continuous increase of carbon dioxide in the atmosphere. Carbon dioxide is a kind of greenhouse gas, and its large-scale emission leads to an increase in global average temperature, abnormal climate and increase in extreme weather. Therefore, it has become a social consensus to capture and store carbon dioxide emitted by human beings (CCS)

At present, alcohol amine aqueous solution absorption method is mainly used in industry. Although the alcohol amine aqueous solution has large absorption and low viscosity, it has problems such as amine decomposition, volatilization, corrosion and high regeneration energy consumption (Riemer, P. W., Ormerod, W. G. Energy Convers. Manag. 1995, 36, 813-818). Room temperature ionic liquids are liquids that are completely composed of ions at room temperature and have many unique properties, such as low volatility, strong solubility, wide electrochemical window, designability and many other advantages (Wilkes, J. S.&Zaworotko, M. J., J. Chem. Soc., Chem. Commun. 1992, 965; Wang, Y. L., Chem. Rev. 2020, 120, 5798). Brennecke et al. used ionic liquids for physical adsorption of carbon dioxide. The absorption needs to be carried out under high pressure and anhydrous conditions (Blanchard, L. A., Hancu, D., Beckman, E. J. & Brennecke, J. F., Nature 1999, 399, 28). Davis et al. connected the amino group to the cation of ionic liquid to realize the chemical adsorption of carbon dioxide (Bates, E. D., Mayton, R. D., Ntai, I. & Davis, J. H. Jr., J. Am. Chem. Soc. 2002, 124, 926). Many researchers at home and abroad have used various basic ionic liquids to achieve chemical absorption of carbon dioxide (Zhang, J. M., et al, Chem. Eur. J., 2006, 12, 4021; Huang, Y., et al, Angew. Chem. Int. Ed., 2017, 56, 13293, Aghaie, M., Rezaei, N. & Zendehboudi, S., Renewable and Sustainable Energy Reviews 2018, 96, 502). Except for a few imidazolium acetate ionic liquids that absorb carbon dioxide and have firm evidence to form new C—C bonds (Holbrey, J. D., et al, Chem. Commun. 2003, 28), other researchers also announced the formation of carbamic acid or formamide. However, Jairton Dupont et al. believed that due to the inevitable presence of water in ionic liquids, bicarbonate and carbonate radical were formed in most of the absorption, and took the data of nuclear magnetic in these works as evidence (Zanatta, M., Simon, N. M. & Dupont, J., ChemSusChem 2020, 13, 3101). Ionic liquid has high viscosity under solvent-free conditions, which makes absorption difficult. The super alkali ionic liquids have strong interaction with carbon dioxide, and high energy consumption is required for desorption. Therefore, finding a more suitable carbon dioxide absorbent is still one of the challenges for scientists.

Carboxylates of quaternary ammonium/quaternary phosphine are also used for absorbing carbon dioxide. Quinn et al. obtain higher absorption by using quaternary ammonium acetate, propionate and malonate under the condition of equimolar water (Quinn, R., Appleby, J. B. and Pez, G. P., J. Am. Chem. Soc. 1995, 117, 329; Quinn, R., Synth. React. Inorg. Met.-Org. Chem. 2001, 31 (3), 359). However, the absorption of carbon dioxide decreases significantly with the increase of water content. For example, for tetraethyl ammonium propionate, when the molar ratio of tetraethylammonium propionate to water is 1:4, the absorption of carbon dioxide is only 0.155 mol/mol carboxylate. Zhang Zhibing et al. of Nanjing University studied the absorption of carbon dioxide by triethylbutylammonium acetate. The results showed that the effect was best when the molar ratio of salt to water is 1:1. At room temperature and one atmosphere, the molar fraction of carbon dioxide can reach 0.386 (Wang, G. N., et al, J. Chem. Eng. Data 2011, 56, 1125). However, the absorption decreases sharply with the increase of water content. When the molar ratio of salt to water is 1:5, the molar fraction of carbon dioxide is only 0.054 under the same conditions. Anderson et al. studied the absorption of carbon dioxide by various quaternary ammonium/quaternary phosphine carboxylates under five atmospheres, and the monohydrate of these salts showed a large absorption (Anderson, K., et al. Green Chem., 2015, 17, 4340). They conducted a study on the absorption of carbon dioxide by tetrabutyl phosphine formate at the water content of five atmospheres, and the results showed that when the mole ratio of salt to water exceeded 1:1, the absorption decreased significantly. Yasaka et al. studied the tetrabutyl phosphine formate, and the results showed that its monohydrate can effectively absorb carbon dioxide. With the increase of water content, the absorption decreased sharply (Yasaka, Y., Ueno, M.& Kimura, Y., Chem. Lett. 2014, 43, 626, Yasaka, Y.&Kimura, Y., J. Chem. Eng. Data 2016, 61, 837, Yasaka, Y., Saito, Y.& Kimura, Y., ChemPhysChem 2018, 19, 1674). Their work mainly focuses on formates, acetates and propionates; although Anderson et al. studied a variety of carboxylates, most of these carboxylates are straight-chain carboxylates (the only branched chains are trihexyltetradecyl phosphine 2-methylpropionate), which mainly studies the absorption of carbon dioxide by the monohydrate of these carboxylates under five atmospheres, and only studied the effect of tetrabutyl phosphine formate and hydrophobic trihexyltetradecylphosphine formate on the absorption of water from carbon dioxide under five atmospheres. These studies have achieved good results, but the reduction effect of water on carbon dioxide absorption has not been solved, and its practicability needs to be improved. In the presence of a large amount of water, even the absorption of carbon dioxide from the aqueous solution, while maintaining the desorption process at a low temperature, fast speed and low energy consumption, the field of carbon dioxide absorption is still blank.

SUMMARY OF THE INVENTION

The object of the present invention is to provide the use of a carboxylate compound as an absorbent for capturing carbon dioxide. The present invention has the advantages of cheap and easy-to-obtain absorbent raw materials, simple synthesis, high capture capacity, stable capture capacity to water, low temperature required for desorption, fast speed and low energy consumption, and has good application prospect.

The carboxylate compound provided by the present invention is used as an absorbent for capturing carbon dioxide and/or in the preparation of an absorbent for capturing carbon dioxide, In the carboxylate compound, the carboxylate anion is a carboxylate radical with a carbon chain having a carbon atom number of more than 3, and the cation is a substituted quaternary ammonium ion and/or quaternary phosphorus ion.

In the above use, the carboxylate compound has appropriate hydrophilicity, is soluble in water at normal temperature, and can be precipitated from water after absorbing carbon dioxide; the carboxylate compound can form a conjugate stable to water after absorbing carbon dioxide.

In the above use, the carboxylate radical with a carbon chain having a carbon atom number of more than 3 is a branched carboxylate radical.

In the above use, the carboxylate radical with a carbon chain having a carbon atom number of more than 3 has a carbon atom number of 4-20.

In the above use, the carboxylate radical with a carbon chain having a carbon atom number of more than 3 has a carbon atom number of 4-10, more specifically 6-9.

In the above use, the carboxylate radical having a carbon chain with a carbon atom number of more than 3 is specifically one of 2,2-dimethylbutyrate, 2,2-dimethylhexanoate, 2-ethylhexanoate, 2-ethylheptanoate, 2-propylpentanoate, 2-propylhexanoate, cyclohexyl formate and n-octanoate.

In the above use, the structural formulas of the substituted quaternary ammonium ion and the substituted quaternary phosphorus ion are shown in the following formulas I and II.

Formula I

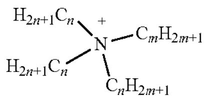

Formula II

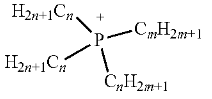

in formulas I and II, n is 2-4, m is 4-16, and substituents in formulas I and II are the same or different.

In the present invention, in formula I and II, n is 2 or 4 and m is 4, 6, 8, 10, 12, 14 or 16; more specifically, in the substituted quaternary ammonium ion shown in formula 1, n is 2 or 4 and m is 4 or 6; in the substituted quaternary phosphorus ion shown in formula II, n is 4 and m is 4, 6, 8, 10, 12, 14 or 16.

In the above use, the substituted quaternary ammonium ion is selected from at least one of triethylbutylammonium, tetrabutylammonium and tributylhexyl ammonium.

The substituted quaternary phosphorus ion is selected from at least one of tetrabutyl phosphine, tributylhexyl phosphine, tributyloctyl phosphine, tributyldecadecyl phosphine, tributyldodecyl phosphine, tributyltetradecyl phosphine, and tributylhexadecyl phosphine.

The present invention also provides an absorbent for capturing carbon dioxide, which is made of or contains the carboxylate compound.

The present invention also provides a method for capturing carbon dioxide with high efficient and energy-saving using carboxylate compounds that are stable to water, comprising the following steps of: placing the aqueous solution of the above carboxylate compound in a carbon dioxide atmosphere to absorb carbon dioxide to obtain the conjugate of carboxylate salts and carbon dioxide, separated from water. In the above method, the molar ratio of the carboxylate compound to water can be 1:0.5-300, specifically 1:0.5, 1:1, 1:10, 1:20, 1:300, 1:0.5-20, 1:0.5-100 or 1:1-200.

In the above method, the conditions for absorbing carbon dioxide are as follows: the partial pressure of carbon dioxide can be 0.01-2 MPa; specifically 0.01 MPa, 0.1 MPa or 2 MPa; the temperature can be 25-80° C.; specifically 25° C. or 80° C.

In the above method, the absorption of carbon dioxide per mole of the carboxylate compound may be 0.1-1.2 moles, specifically 0.12-1.1 moles.

In the above method, the method further comprises the step of regeneration of the carboxylate compound after absorbing carbon dioxide.

In the above method, the regeneration has the following steps of: under reduced pressure, the pressure can be 0.01-1 atmosphere, the temperature can be 10-120° C. (that is, room temperature to 120° C., the room temperature is a common knowledge in the art, and specifically, it may be 10-30° C.), and the time may be 1 min-10 h. Specifically, the temperature can be from room temperature to 80° C., and specifically from 25° C. to 80° C.

The present invention also provides use of another carboxylate compound as an absorbent for capturing carbon dioxide and/or in the preparation of an absorbent for capturing carbon dioxide, wherein, in the carboxylate compound, the carboxylate acid anion is a carboxylate radical with a branched chain having a total carbon atom number of more than 6, and the cation is at least one of a substituted quaternary ammonium ion, quaternary phosphorus ion, pyridinium ion, pyrrole ion, piperidinium ion, imidazolium ion and metal ion;

wherein, the structural formulas of the substituted quaternary ammonium ion and the substituted quaternary phosphine ion are shown in the following formulas I-1 and II-1:

Formula I-1

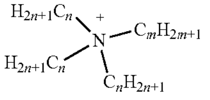

Formula II-1

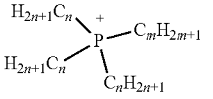

in formulas I-1 and formula II-1, n is 1-4 and m is 1-16, and the substituents in formula I-1 and formula II-1 are the same or different.

In the above use, the carboxylate radical with a branched chain having a carbon atom number of more than 6 has a carbon atom number of 7-20.

In the above use, the carboxylate radical with a branched chain having a carbon atom number of more than 6 has a carbon atom number of 8-16.

In the above use, the carboxylate radical with a branched chain having a total carbon atom number of more than 6 is selected from at least one of 2,2-dimethylhexanoate, 2-ethylhexanoate, 2-ethylheptanoate, 2-propylpentanoate, 2-propylhexanoate, 2-propylnonanoate, 2-butyloctanoate and 2-hexyldecanoate.

In the above use, the substituted quaternary ammonium ion is selected from at least one of tetramethyl ammonium, tetraethyl ammonium and tributylmethyl ammonium; and the substituted quaternary phosphorus ion is selected from at least one of tetramethyl phosphine, tetraethyl phosphine and tributylmethyl phosphine.

In the above use, the pyridinium ion is N-substituted pyridinium cation, and its structure formula is shown in the following formula III;

the pyrrolidinium ion is N-substituted pyrrole cation, and its structure formula is shown in the following formula IV;

the piperidinium ion is N-substituted piperidinium cation, and its structure formula is shown in the following formula V;

the imidazolium ion is a disubstituted or/and trisubstituted imidazolium cation, and its structure formula is shown in the following formula VI; and the metal ion is selected from at least one of lithium, sodium, potassium and cesium;

Formula III

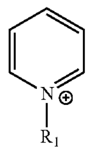

Formula IV

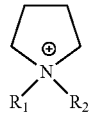

Formula V

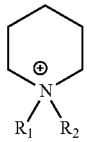

Formula VI

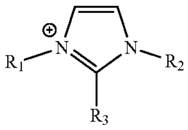

in formulas III, IV, V and VI, $R_1$ and $R_2$ are straight aliphatic chains with carbon atoms greater than or equal to 1, $R_3$ is H or $CH_3$, and $R_1$ and $R_2$ are the same or different.

In the above use, $R_1$ and $R_2$ in the formula III, IV, V and VI are straight aliphatic chains with 1-10 carbon atoms.

The present invention also provides an absorbent for capturing carbon dioxide, the active component of which is the carboxylate compound.

The present invention further provides a method for capturing carbon dioxide using carboxylate compounds that are stable to water, comprising the following steps of: placing the aqueous solution of the carboxylate compound or the aqueous solution of the carboxylate compound in carbon dioxide atmosphere to absorb carbon dioxide to obtain the conjugate of carboxylate salts and carbon dioxide, separated from water. In the above method, the molar ratio of the carboxylate compound to water is 1:(0.5-100), specifically 1:0.5, 1:1, 1:20, 1:100, 1:(20-100) or 1:1-(0.5-20).

In the above method, a condition for absorbing carbon dioxide is as follows: the partial pressure of carbon dioxide can be 0.00004-0.5 MPa; specifically 0.01 MPa, 0.1 MPa, 0.5 MPa, 0.01-0.1 MPa or 0.1-0.5 MPa; and capture from the atmosphere (the partial pressure of carbon dioxide is about 0.00004 MPa); the temperature can be 5-80° C., specifically 5° C., 25° C., 80° C., 5-25° C. or 25-80° C.

In the above method, the absorption of carbon dioxide per mole of the carboxylate compound can be 0.4-1.1 moles; specifically 0.49, 0.5, 0.6, 1.0, 1.05 moles, 0.49-0.525 moles or 0.49-1.05 moles.

In the above method, the method further comprises the step of regeneration of the carboxylate compound after absorbing carbon dioxide.

In the above method, the regeneration has the following steps of: under reduced pressure, the pressure can be 0.01-1 atmosphere, the temperature can be 10-120° C. (that is, room temperature −120° C., the room temperature is a common knowledge in the art, and specifically the temperature can be 10-30° C.), specifically 250 C, 120° C. or 25-120° C.; the time can be 1 min-10 h, specifically 1 h, 3 h or 1-3 h.

DETAILED DESCRIPTION

The experimental methods in the following embodiments are conventional methods unless otherwise specified.

Carboxylate salts in the following embodiment are synthesized by a mature technique (Suarez, P. A. Z.; Dullius, J. E. L.; Einloft, S.; DE Souza R. F. and Dupont, J., *Polyhedron,* 1996, 15, 1217-1219).

The embodiments described below are only used to explain the present application and should not be construed as limiting the scope of use of the present invention.

Example 1

2 mmol of tributylhexyl phosphine 2-ethylhexanoate (0.86 g) and 40 mmol of water (0.72 g) were added in a glass bottle, a carbon dioxide balloon was connected to make the solution in carbon dioxide at one atmosphere. After stirring at 25° C. for 12 hours, the system was divided into an organic phase and an aqueous phase. The balloon was taken off and the gas carbon dioxide on the upper part of the solution in the bottle was replaced with air, then titrated with sodium hydroxide solution (0.2 w %), phenolphthalein was used as the indicator, and the carbon dioxide absorption amount was 0.98 mmol.

Under the same conditions, tributylhexyl phosphine 2-ethylhexanoate can be replaced with the following reagents, and the absorption of carbon dioxide by tetrabutyl phosphine 2-ethylhexanoate, tributyloctyl phosphine 2-ethylhexanoate, tributyldecadecyl phosphine 2-ethylhexanoate, tributyldodecyl phosphine 2-ethylhexanoate, tributyltetradecyl phosphine 2-ethylhexanoate, tributylhexadecyl phosphine 2-ethylhexanoate, tetrabutylammonium 2-ethylhexanoate, triethylbutylammonium 2-ethylhexanoate, tributylhexyl ammonium 2-ethylhexanoate, tributylhexyl phosphine 2,2-dimethylbutyrate, tributylhexyl phosphine 2-propylpentanoate, tributylhexyl phosphine 2,2-dimethylhexanoate, tributylhexyl phosphine 2-propylhexanoate, tributylhexyl phosphine 2-ethylheptanoate, tributylhexyl phosphine cyclohexyl formate and tributylhexyl phosphine n-octanoate with 2 mmol of each (to which 40 mmol of water was added respectively) was measured respectively. After absorbing carbon dioxide, a new liquid phase or solid phase was formed respectively, and the absorption amounts were 0.87, 2.2, 1.8, 1.6, 1.6, 1.7, 0.86, 0.24, 0.96, 0.22, 1.02, 0.53, 1.0, 0.99, 0.71 and 0.36 mmol, respectively.

Example 2

Substantially the same as Example 1 of the present invention, except that 2 mmol of tributylhexyl phosphine 2-ethylhexanoate (0.86 g) and 1 mmol of water were added, the others were completely the same as Example 1, and the carbon dioxide absorption amount was 1.0 mmol. It showed that the absorption amount when the molar ratio of the carboxylate compound to water was 1:0.5 was compared with that of Example 1, its carbon dioxide absorption amount was stable to water.

Example 3

Substantially the same as Example 2 of the present invention, except that 2 mmol of water, the others were completely the same as Example 2, and the carbon dioxide absorption amount was 1.0 mmol. It showed that the absorption amount when the molar ratio of the carboxylate compound and water was 1:1 was compared with that of Example 1, its carbon dioxide absorption amount was stable to water and does not change with the increase of water.

Example 4

Substantially the same as Example 1 of the present invention, for tributylhexyl phosphine 2-ethylhexanoate, except that the temperature was at 80° C., the others were completely the same as Example 1. After absorbing carbon dioxide, a new organic phase was formed, and its carbon dioxide absorption amount was 0.62 mmol. It showed that the absorption amount when the above carboxylate solution was at different temperatures was compared with that of Example 1 of the present invention, a higher carbon dioxide capture capacity can be still obtained at high temperatures.

Example 5

Substantially the same as Example 1 of the present invention, for tributylhexyl phosphine 2-ethylhexanoate, except that the atmosphere was 0.01 MPa of carbon dioxide partial pressure and 0.09 MPa of nitrogen, the others were completely the same as Example 1, and the carbon dioxide absorption amount was 0.40 mmol. It showed that the absorption amount when the above carboxylate solution was at low partial pressure of carbon dioxide was compared with that of Example 1 of the present invention, a higher carbon dioxide capture capacity can be still obtained at low carbon dioxide partial pressure.

Example 6

2 mmol of trityloctyl phosphine 2-ethylhexanoate (0.92 g), 40 mmol of water (0.72 g) were added into a pressure kettle, 2 MPa of carbon dioxide was introduced, and stirred at 25° C. for 12 hours. After decompression, after replacing the gas carbon dioxide on the upper part of the solution in the kettle with air, titrated with sodium hydroxide solution (0.2 w %) using phenolphthalein as the indicator, the carbon dioxide absorption amount was 1.2 mmol. It showed that the absorption amount when the above carboxylate solution was at high carbon dioxide pressure was compared with that of Example 1 of the present invention, a higher carbon dioxide capture capacity can be still obtained at high carbon dioxide partial pressure.

Example 7

Substantially the same as Example 1 of the invention, for tributylhexyl phosphine 2-ethylhexanoate, except that the carbon dioxide atmosphere was changed to carbon dioxide bubbling (20 ml/min) and absorbed for 30 minutes, the others were completely the same as Example 1, and the carbon dioxide absorption amount was 0.98 mmol. From the comparison of Examples 1 and 7, it can be seen that different absorption modes had relatively small effect on the carbon dioxide absorption amount, indicating that the carbon dioxide absorption amount of the present invention was not affected by the absorption modes.

Example 8

For tributylhexyl phosphine 2-ethylhexanoate, the carbon dioxide absorption part was completely the same as in Example 1 of the present invention. After the absorption was completed, it was exposed to the air and stirred for 3 hours at room temperature (25° C.). It was determined that carbon dioxide was released completely. It showed that the above-mentioned carboxylate solution can be regenerated after absorbing carbon dioxide.

Example 9

Substantially the same as Example 8 of the present invention, except that the release part was stirred at 80° C. for 30 minutes, the others were completely the same as Example 8. It was determined that carbon dioxide was released completely. From the comparison of Example 8 and Example 9 of the present invention, it can be seen that carboxylate compounds can be regenerated at different temperatures.

Example 10

Substantially the same as Example 8 of the invention, except that the release part was changed to keep stirring for 1 hour under reduced pressure of the water pump (0.01 atmosphere), the others are completely the same as Example 8. It was determined that carbon dioxide was released completely. From the comparison of Example 8 and Example 10 of the present invention, it can be seen that the regeneration of carboxylate compounds can be achieved under different pressures.

Example 11

1 mmol of tributylhexadecyl phosphine 2-ethylhexanoate (57 mg) was added into 5.4 g of water (0.3 mol). After dissolution, carbon dioxide bubbles (20 ml/min) were bubbled into the solution at room temperature for three minutes, and the solution became turbid, indicating that the carboxylate could effectively absorb carbon dioxide at this concentration and precipitate after absorption. Stop introducing carbon dioxide, expose the solution to the air, continue stir at room temperature (25° C.), and the solution become clear after 3 minutes, indicating that the solution can release carbon dioxide quickly. From comparison of Example 1 and Example 11 of the present invention, it can be seen that the absorption and regeneration of carboxylate compounds can be achieved at different concentrations and different absorption modes.

Example 12

2 mmol of tetrabutylammonium 2-ethylhexanoate (0.434 g) and 2 mmol of water (0.036 g) were added in a glass bottle, a carbon dioxide balloon was connected to make the solution in carbon dioxide at 0.1 MPa. After stirring at 25° C. for 12 hours, the system was divided into an organic phase and an aqueous phase. The balloon was taken off and the gas carbon dioxide on the upper part of the solution in the bottle was replaced with air, then titrated with sodium hydroxide solution (0.2 w %), phenolphthalein was used as the indicator, and the carbon dioxide absorption amount was 1.0 mmol.

Under the same conditions, tetramethyl ammonium 2-ethylhexanoate can be replaced with the following reagents, and the absorption of carbon dioxide by tetraethyl ammonium 2-ethylhexanoate, tetramethyl phosphine 2-ethylhexanoate, tetramethyl ammonium 2-ethylhexanoate, tetraethyl ammonium 2-ethylhexanoate, tributylmethyl phosphine 2-ethylhexanoate, tributylmethyl phosphine 2,2-dimethylhexanoate, tributylmethyl phosphine 2-ethylheptanoate, tributylmethyl phosphine 2-propylpentanoate, tributylmethyl phosphine 2-propylhexanoate, tetramethyl ammonium 2-propylnonanoate, tetramethyl ammonium 2-butyloctanoate, tetramethyl ammonium 2-hexyldecanoate, sodium 2-ethylhexanoate, potassium 2,2-dimethylhexanoate, lithium 2-ethylheptanoate, cesium 2-propylpentanoate, N-butylpiperidinium 2-ethylhexanoate, N-butyl-N-methylpyrrolidinum 2-ethylhexanoate, N-butyl-N-methylpiperidinium2-ethylhexanoate and 1-butyl-2,3-dimethyl 2-ethylhexanoate with 2 mmol of each (to which 2 mmol of water was added respectively) was measured respectively. After absorbing carbon dioxide, a new liquid phase or solid phase was formed respectively, and the absorption amounts were 1.03, 0.99, 1.02, 0.98, 1.03, 1.01, 0.99, 1.00, 1.01, 1.01, 1.01, 1.01, 1.01, 1.03, 1.05, 0.99, 0.97, 0.98, 0.95, 1.00, 1.02, 0.99, 1.02 mmol, respectively. All absorptions were in the range of 0.95-1.05 mmol.

It indicated that all above substances can effectively absorb carbon dioxide.

Example 13

Substantially the same as Example 12 of the present invention, except that 2 mmol of tributylmethyl ammonium 2-ethylhexanoate (0.86 g) and 1 mmol of water (0.018 g) were added, the others were completely the same as Example 12, and the carbon dioxide absorption amount was 1.0 mmol. It showed that the absorption amount when the molar ratio of the carboxylate compound to water was 1:0.5 was compared with that of Example 12, its carbon dioxide absorption amount was stable to water within a certain range.

Example 14

Substantially the same as Example 12 of the present invention, except that 2 mmol of sodium 2-hexyldecanoate (0.56 g) was added into 200 mmol of water (3.6 g of water), the others were completely the same as Example 12, and the carbon dioxide absorption amount was 2.05 mmol. It showed that the carbon dioxide absorption amount of the above-mentioned carboxylates was stable to water in a large range.

After absorption, the solution was heated at 120° C. for 3 hours, and it was determined that carbon dioxide was released completely. It indicated that the carboxylate solution can be regenerated after absorbing carbon dioxide.

Example 15

Substantially the same as Example 14 of the present invention, except that the absorption temperature was 80° C., the others are completely the same as Example 3, and the carbon dioxide absorption amount was 2.0 mmol. It showed that the carbon dioxide absorption amount of the above-mentioned carboxylates was stable to temperature in a large range compared with that of Example 14.

Example 16

2 mmol of tetramethyl ammonium 2-ethylhexanoate (0.69 g) and 0.7 g of water were added in a glass bottle, a carbon dioxide balloon was connected to make the solution in carbon dioxide at one atmosphere, stirred at 5° C. for 12 hours. The balloon was taken off and the gas carbon dioxide on the upper part of the solution in the bottle was replaced with air, then titrated with sodium hydroxide solution (0.2 w %), phenolphthalein was used as the indicator, the carbon dioxide absorption amount was 1.2 mmol. Compared with Example 12, it was shown that reducing the absorption temperature was beneficial to improving the absorption.

After absorption, the solution was exposed to air and stirred continuously at room temperature (25° C.) for 3 hours, and it was determined that carbon dioxide was released completely. This shows that the above carboxylate solution can be regenerated after absorbing carbon dioxide.

Example 17

Substantially the same as Example 12 of the present invention, for tetrabutylammonium 2-ethylhexanoate, except that the partial pressure of carbon dioxide was 0.01 MPa and nitrogen 0.09 MPa, the others are the same as Example 12, and the carbon dioxide absorption amount was 0.98 mmol.

0.278 g of sodium 2-hexyldecanoate (1 mmol) was dissolved in 1 g of water, and the air pump was used to provide air for bubbling (the partial pressure of carbon dioxide in the atmosphere was about 0.00004 MPa). The air flow was 10 ml per minute, after 12 hours, titrated with sodium hydroxide solution (0.2 w %) until it was clear, and the carbon dioxide absorption amount was 0.10 mmol.

The carbon dioxide absorption amount by the above carboxylate solution at low partial pressure of carbon dioxide was compared with that of Example 12 of the present invention, indicating that a high carbon dioxide capture capacity can still be obtained at low partial pressure of carbon dioxide, and even a certain amount of carbon dioxide can be absorbed from the atmosphere.

Example 18

2 mmol of tributylmethyl ammonium 2-ethylhexanoate (0.69 g), 2 mmol of water (0.036 g) were added to the pressure kettle, 0.5 MPa carbon dioxide was introduced, and the mixture was stirred at 25° C. for 12 hours. After decompression, the gas carbon dioxide on the upper part of the solution in the kettle was replaced with air, and measured according to the method in Example 12, and the carbon dioxide absorption amount was 1.5 mmol. The carbon dioxide absorption amount by the above carboxylate solution at high partial pressure of carbon dioxide was compared with that of Example 12 of the present invention, indicating that a high carbon dioxide capture capacity can still be obtained at high partial pressure of carbon dioxide.

It can be seen from the above results that:

1) The halide salts of the organic cations in the present invention are bulk chemicals, and the price is several thousand yuan per ton; However, for the current market price of halides of tributylhexyl phosphine and tributyloctyl phosphine in the Comparative example (thousands of yuan per kilogram), it is obvious that the raw material price of the present invention is lower;

2) In Examples 1, 3 and 4 of the present invention, sodium 2-ethylhexanoate, potassium 2,2-dimethylhexanoate, lithium 2-ethylheptanoate, cesium 2-propylpentanoate, and sodium 2-hexyldecanoate are used for carbon dioxide absorption experiments. The inorganic salt metal ions such as lithium, sodium, potassium and cesium used have higher stability;

3) The present invention can obtain a higher carbon dioxide absorption amount (relative to the mass of the absorbent) under the appropriate water content, for example, the carbon dioxide absorption amount absorbed by per kilogram of absorbent is 2.12 and 1.11 moles per kilogram of carbon dioxide, respectively, per mole of tetramethylammonium 2-ethylhexanoate (molecular weight 217.3) and 2-ethylhexylphosphine (molecular weight 430.7) under the molar ratio of salt to water of 1:1 and carbon dioxide of one atmosphere.

INDUSTRIAL APPLICATIONS

1. The present invention is used to solve the problems of the existing system, such as corrosiveness, easy volatilization and high energy consumption. It can obtain higher carbon dioxide capture capacity under high temperature, low pressure and high pressure of carbon dioxide partial pressure.

2. When the selected carboxylate aqueous solution absorbs carbon dioxide, its conjugate with carbon dioxide will be separated from water in a liquid or solid state, indicating that the conjugate of the selected carboxylate and carbon dioxide is stable in water, 3. Carboxylates can be regenerated, which can be achieved by decompression at room temperature. Depending on different conditions, the absorption time can range from a few minutes to several hours. After the carbon dioxide is released, the carboxylates and water are miscible. Raising the temperature increases the regeneration rate.

4. The cations in the carboxylate compounds used in the invention are substituted quaternary ammonium ion, substituted quaternary phosphorus ion, pyridinium ion, pyrrole ion, piperidinium ion, imidazolium ion and metal ion, which are inexpensive compared with the onium ions with higher price of tetraalkyl substituted phosphorus/ammonium, greatly reduces the cost of carbon dioxide capture.

We claim:

1. A method for capturing carbon dioxide, comprises using carboxylate compound as an absorbent, wherein, in the carboxylate compound, the carboxylate acid anion is a carboxylate radical with a branched chain having a total carbon atom number of more than 6, and the cation is selected from at least one of a substituted quaternary ammonium ion, quaternary phosphorus ion, pyridinium ion, pyrrole ion, piperidinium ion, imidazolium ion and metal ion;

wherein, the structural formulas of the substituted quaternary ammonium ion and the substituted quaternary phosphine ion are shown in the following formulas I-1 and II-1:

Formula I

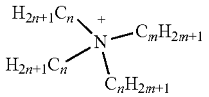

Formula II

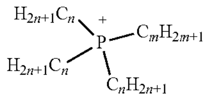

in formulas I-1 and formula II-1, n is 1-4 and n is 1-16, and the substituents in formula I-1 and formula II-1 are the same or different, wherein the carboxylate radical with a branched chain having a total carbon atom number of more than 6 is selected from at least one of 2,2-dimethylhexanoate, 2-ethylhexanoate, 2-ethylheptanoate, 2-propylpentanoate, 2-propylhexanoate, 2-propylnonanoate, 2-butyloctanoate and 2-hexyldecanoate.

2. The method of claim 1, wherein, the carboxylate radical with a branched chain having a total carbon atom number of more than 6 has a carbon atom number of 7-20.

3. The method of claim 1, wherein, the carboxylate radical with a branched chain having a total carbon atom number of more than 6 has a carbon atom number of 8-16.

4. The method of claim 1, wherein, the substituted quaternary ammonium ion is selected from at least one of tetramethyl ammonium, tetraethyl ammonium and tributylmethyl ammonium triethylbutylammonium, tetrabutylammonium and tributylhexyl ammonium; and the substituted quaternary phosphorus ion is selected from at least one of tetramethyl phosphine, tetraethyl phosphine and tributylmethyl phosphine, tetrabutyl phosphine, tributylhexyl phosphine, tributyloctyl phosphine, tributyldecadecyl phosphine, tributyldodecyl phosphine, tributyltetradecyl phosphine, and tributylhexadecyl phosphine.

5. The method of claim 1, wherein, the pyridinium ion is N-substituted pyridinium cation, and its structure formula is shown in the following formula III;

the pyrrolidinium ion is N-substituted pyrrole cation, and its structure formula is shown in the following formula IV;

the piperidinium ion is N-substituted piperidinium cation, and its structure formula is shown in the following formula V;

the imidazolium ion is a disubstituted or/and trisubstituted imidazolium cation, and its structure formula is shown in the following formula VI; and the metal ion is selected from at least one of lithium, sodium, potassium and cesium;

Formula III

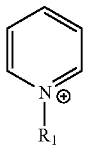

Formula IV

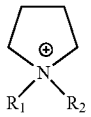

-continued

Formula V

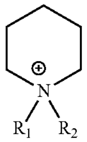

Formula VI

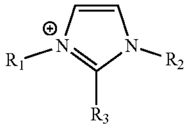

in formulas III, IV, V and VI, $R_1$ and $R_2$ are straight aliphatic chains with carbon atoms greater than or equal to 1, $R_3$ is H or $CH_3$, and $R_1$ and $R_2$ are the same or different.

6. The method of claim 5, wherein, $R_1$ and $R_2$ in the formula III, IV, V and VI are straight aliphatic chains with 1-10 carbon atoms.

* * * * *